United States Patent [19]
Longo

[11] Patent Number: 5,524,385
[45] Date of Patent: Jun. 11, 1996

[54] FISH HOOK AND METHOD OF ATTACHING LEADER

[76] Inventor: Vincent M. Longo, 5006 SW. 92nd Ter., Cooper City, Fla. 33328

[21] Appl. No.: 291,976

[22] Filed: Aug. 17, 1994

[51] Int. Cl.⁶ ................................................ A01K 83/00
[52] U.S. Cl. ........................................ 43/44.83; 43/43.16
[58] Field of Search ........................... 43/43.16, 44.83, 43/44.81; D22/144; 289/1.2, 1.5; 29/9

[56] References Cited

U.S. PATENT DOCUMENTS

| | | | |
|---|---|---|---|
| 831,211 | 9/1906 | Buckingham, Jr. | 43/44.83 |
| 1,156,152 | 10/1915 | Krenrick | 43/44.83 |
| 2,686,381 | 8/1954 | Peterson | 43/42.09 |
| 2,982,049 | 5/1961 | Yost | 43/44.4 |
| 2,990,641 | 7/1961 | Weidman | 43/43.16 |
| 3,758,976 | 9/1973 | Szwolkon | 43/43.16 X |
| 3,898,760 | 8/1975 | Klein | 43/44.83 |
| 4,879,835 | 11/1989 | Sprayberry | 43/44.83 |
| 5,241,775 | 9/1993 | Matsumura | 43/44.83 |
| 5,279,067 | 1/1994 | Tollison | 43/44.83 |

FOREIGN PATENT DOCUMENTS

| | | | |
|---|---|---|---|
| 726188 | 5/1932 | France | 43/44.83 |
| 1165445 | 10/1969 | United Kingdom | 43/44.83 |
| 1180976 | 2/1970 | United Kingdom | 43/43.16 |
| 2100103 | 12/1982 | United Kingdom | 43/43.16 |

Primary Examiner—Richard K. Seidel
Assistant Examiner—Jeanne M. Elpel
Attorney, Agent, or Firm—Malin, Haley, DiMaggio & Crosby

[57] ABSTRACT

An improved fish hook and method of attaching line to the hook shank with a knot such that knot strength is maximized, and line force is dissipated along the longitudinal axis of the shank. The improvement comprises a hollow tubular member attached to a fish hook shank such that, when attached, the tube is substantially aligned with the shank, and positioned proximate the shank head. Fishing line is secured to the hook shank by threading the line through the attached tube and knotting the line about the shank such that line load is dissipated longitudinally along the shank axis. The foregoing method of attaching line has been found to increase knot strength while dissipating force along the longitudinal shank axis.

5 Claims, 3 Drawing Sheets

FISH HOOK AND METHOD OF ATTACHING LEADER

BACKGROUND OF THE INVENTION

1. Field of the Invention

The present invention relates to fish hooks, and more particularly to an improved fish hook and method of attaching a fishing line, leader, or snell, to the hook.

2. Description of the Prior Art

Attaching fishing line to a fish hook in a reliable manner is vital to fish catching success. This process is often complicated by rough seas, wind, rain or cold temperatures. In addition, wire and monofilament leader lines can prove difficult for an angler to manipulate further complicating the process.

Modern fishing lines are, for the most part, made of synthetic materials such as: nylon monofilament, braided nylon, and braided Dacron. Monofilament line, however, has gained wide acceptance in recent years as the true all-purpose line for modern fishing. Monofilament is currently used with all spinning reels, for plug-casting, for ocean trolling and salt water fishing in general, and as leader material as well as for line.

As a general rule, the highest-priced monofilament lines are those which have been highly processed for limpness, and for the smallest ratio of breaking test to line diameter. Many freshwater anglers prefer the handling characteristics of limp line because it spools well and does not tend to spring off as much as stiffer line.

On the other hand, saltwater anglers have found that limp monofilament tends to quickly fatigue or weaken under the pressures of big game fishing when big lures and various other saltwater rigging is used. Furthermore, saltwater anglers have found that monofilament line strength is reduced when the line is secured by knot. Specifically, monofilament "knot strength" limits a rigging as a weak link limits the strength of a chain.

The problem of line failure is compounded by an anglers inability to tie reliable knots since the majority of angling knots (especially those tied with monofilament) are almost certain to fail unless they are tied properly. Experienced anglers have found that improperly tied knots, may not withstand 100 percent of rated test, and may fail as low as 50 percent, when subjected to sudden jolts.

Another potential cause of line failure in the vicinity of the knot is fraying of the line by a hooked fish. Even the small teeth of a bass might wear through leader line attached to a fish hook. While monofilament leader line is generally preferred, the risk of failure often forces anglers to secure the hook using wire; especially when fishing for sharp-toothed species such as mackerel, bluefish, and barracuda.

The prior art reveals several inventions directed toward overcoming the aforementioned objections. One group of prior art patents is directed to maximizing knot strength by securing the line to the hook shank. For example, U.S. Pat. No. 1,156,152 issued to Krenrick, discloses securing fishing line to a hook shank using a clamping band. The disclosed method, however, requires the use of a mechanical press fit, to secure the line; and applying sufficient force to secure the leader may prove difficult for some.

U.S. Pat. No. 4,879,835, issued to Sprayberry, is directed toward a knotless fishing jig hook designed to achieve various rated line strengths by eliminating knot stress points of knots and the passing the line through the hook eye. Sprayberry also requires the use of mechanical press force to secure the line by using a sinker as a gripping member.

U.S. Pat. No. 5,241,775, issued to Matsumura teaches positioning the leader in contact with the shank end, winding a metallic wire around the shank and leader such that the resulting wire coil secures and protects the leader. This method, however, requires both dexterity and practice and may not prove an effective alternative for the inexperienced or less dexterous angler.

U.S. Pat. No. 2,686,381, issued to Peterson, discloses a fish hook having a conventional line attaching eye and also incorporating a bait mounting band for removably securing a variety of lures. While the mounting band incorporates a structural feature similar to that of the instant invention, the function, as will soon become apparent, is completely different. Peterson contemplates a tubular hook mounted band for securing lures, not for attaching fishing line. In contrast, Peterson contemplates attaching fishing line in a conventional manner; thereby realizing all of the aforementioned knot related problems.

U.S. Pat. No. 5,279,067, issued to Tollison, is directed to a method of attaching a line to a hook having an elongated shank with an open-ended slot whereby a properly tied line entwines upon itself in the slot when pulled. The hook required by Tollison, is unique and not readily available thus limiting its appeal.

While the aforementioned devices disclose various designs directed to securing leader to a fish hook, no such device teaches the benefits of attaching leader to a fish hook with a relatively simple and well known knot such that the resulting connection disperses force along the hook shank while maximizing knot strength. The instant invention is intended to address and solve these problems which are not adequately resolved by the prior inventions.

SUMMARY OF THE INVENTION

The present invention contemplates an improved fish hook and method of attaching line to the hook shank with a knot such that knot strength is maximized, and line force is dissipated along the longitudinal axis of the shank by knotting the line about the hook shank.

The fish hook of the present invention comprises an eyeless fresh or saltwater hook having a barbed end, and a shank. The shank incorporates a tubular member, rigidly secured and in parallel alignment with the shank's longitudinal axis. Line is attached to the hook by threading the line down through the tubular member and securing the line about the shank using a variation of the popular clinch knot. Thus, the instant invention contemplates knotting the line about a point on the shank substantially below the shank head.

Securing the leader line about the shank allows for more gradual line curvature than would occur if the line were secured through a conventional hook eye. As a result, line stress does not concentrate to the same extent as if the line were tied through the eyelet, thus resulting in greater knot strength.

In addition, it has been found that attaching line to the hook of the instant invention increases the hooks resistance to bending under extreme force. Furthermore, it has also been found that attaching a tubular member to a hook shank as taught in the instant invention causes the hook to spin less than a conventional hook when trolling.

In accordance with the present invention, it is an object hereof to provide an improved fish hook and method of attaching leader to the hook.

An additional object of the instant invention is to provide an improved method of attaching a leader to a fish hook as to maximize knot strength.

A further object of the instant invention is to provide an improved fish hook wherein the knot securing fishing line to the hook is positioned proximate the shank mid point.

In accordance with these and other objects which will become apparent hereinafter, the instant invention will now be described with particular reference to the accompanying drawings.

DESCRIPTION OF THE PREFERRED EMBODIMENTS

Figures 1, 2, 3:
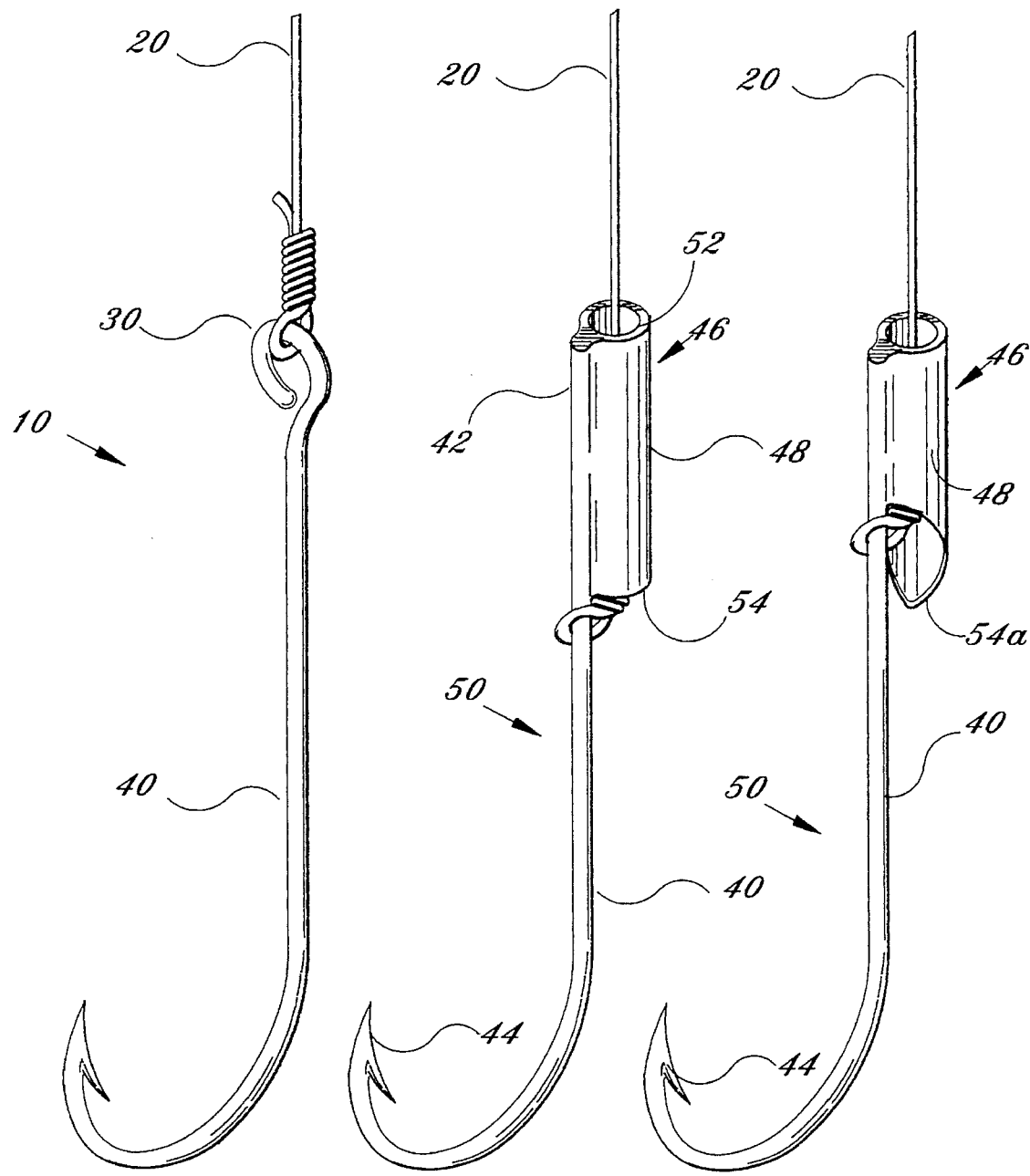
FIG. 1 depicts fishing line attached to a typical fish hook in a conventional manner.
FIG. 2 depicts the fish hook of the instant invention.
FIG. 3 depicts an alternate embodiment of the fish hook of the instant invention.

With a conventional fish hook, generally depicted as 10 in FIG. 1, fishing line 20 is attached by looping the line through hook eye 30 and securing the line with one of any number of knots. Hook eyes are commonly produced in one of two well known configurations. A hook having a "ringed" eye 30, as depicted in FIG. 1, is formed by bending the shank into a circle; and is generally used with fairly light tackle and reasonably low drag since the ring eye can straighten out under stress. Hooks having "needle" eyes (not shown), are formed by drilling through the top of the shank; and are chosen by many offshore fishermen for use with heavier tackle. In both configurations, the diameter of the material forming the hook eye is smaller than the diameter than the shank.

Since the hook material forming eye 30, about which line 20 is secured, is perpendicular to the force applied by line 20 when under tension, the line experiences a higher degree of curvature than would be experienced by winding the line about the longitudinal shank. The high degree of curvature experienced by winding the line through a hook eye, perpendicular to the applied force, results in concentrating line stress, which often leads to line failure at the high stress points. Anglers refer to the ability of a line of given test, knotted about a fish hook, to withstand loading as "knot strength". Since knot strength limits the ability of a rig, of given test, to withstand loading, anglers are often forced to use higher test line to compensate for the weak link caused by knotting. Using higher test line is generally undesirable, however, for various reasons including cost and ease of manipulation.

The instant invention contemplates an improved fish hook and a method of attaching leader line to the hook such that line stress is dissipated to a greater extent than would occur if the line was attached to a hook eye in a conventional manner. Turning now to FIGS. 2–3, the instant invention comprises a fresh or salt water fish hook, generally designated 50, having a shank 40, said shank having an upper end terminating in a shank head 42, and a lower, curved end terminating in a barb 44. The instant invention contemplates rigidly attaching a tubular member, generally designated 46, to shank 40 proximate shank head 42.

Tubular member 46 is preferably fabricated from metal, however, any suitable material may be used. Tubular member 46 has a cylindrical wall 48, a top end 52, a bottom end 54 and an aperture extending therethrough. Tubular member bottom end 54 may be formed by a plane intersecting the tube central axis at a right angle as depicted in FIG. 2; or bottom end 54 may be formed by a plane intersecting the tube central axis at an angle as depicted in FIG. 3. Tubular member 46 is rigidly attached to hook shank 40 proximate shank head 42 such that tubular member 46 is substantially aligned with the longitudinal shank axis, and positioned on the shank side opposite barb 44 as best depicted in FIGS. 2 and 3. The means of attachment may be by use of an epoxy resin, welding, or any suitable method which results in rigid attachment that will withstand the often harsh fishing environment.

Figures 4A, 4B, 4C, 4D:
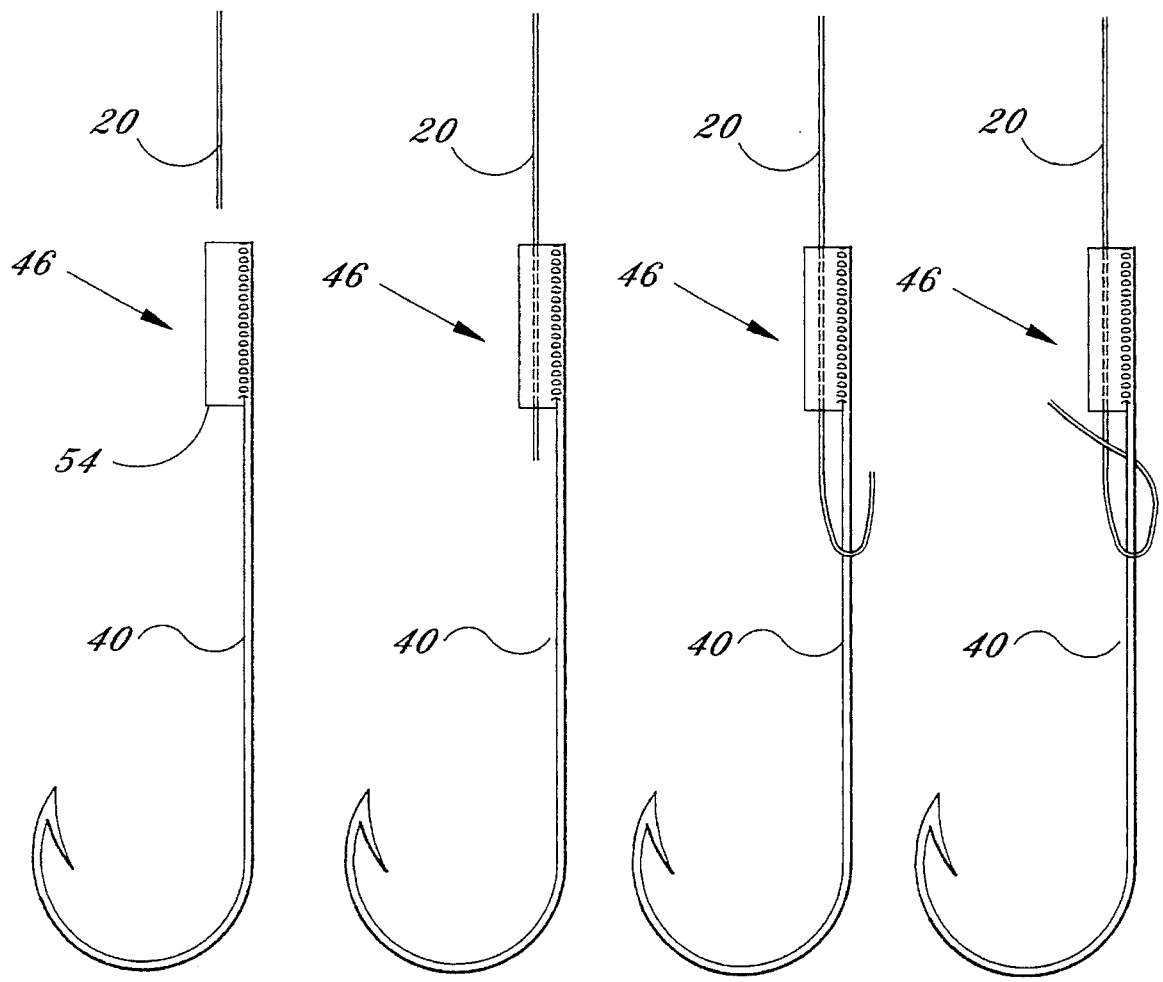
FIGS. 4A–4F illustrate a method of attaching fishing line to the fish hook of the instant invention.
Figures 4E, 4F, 5A, 5B:
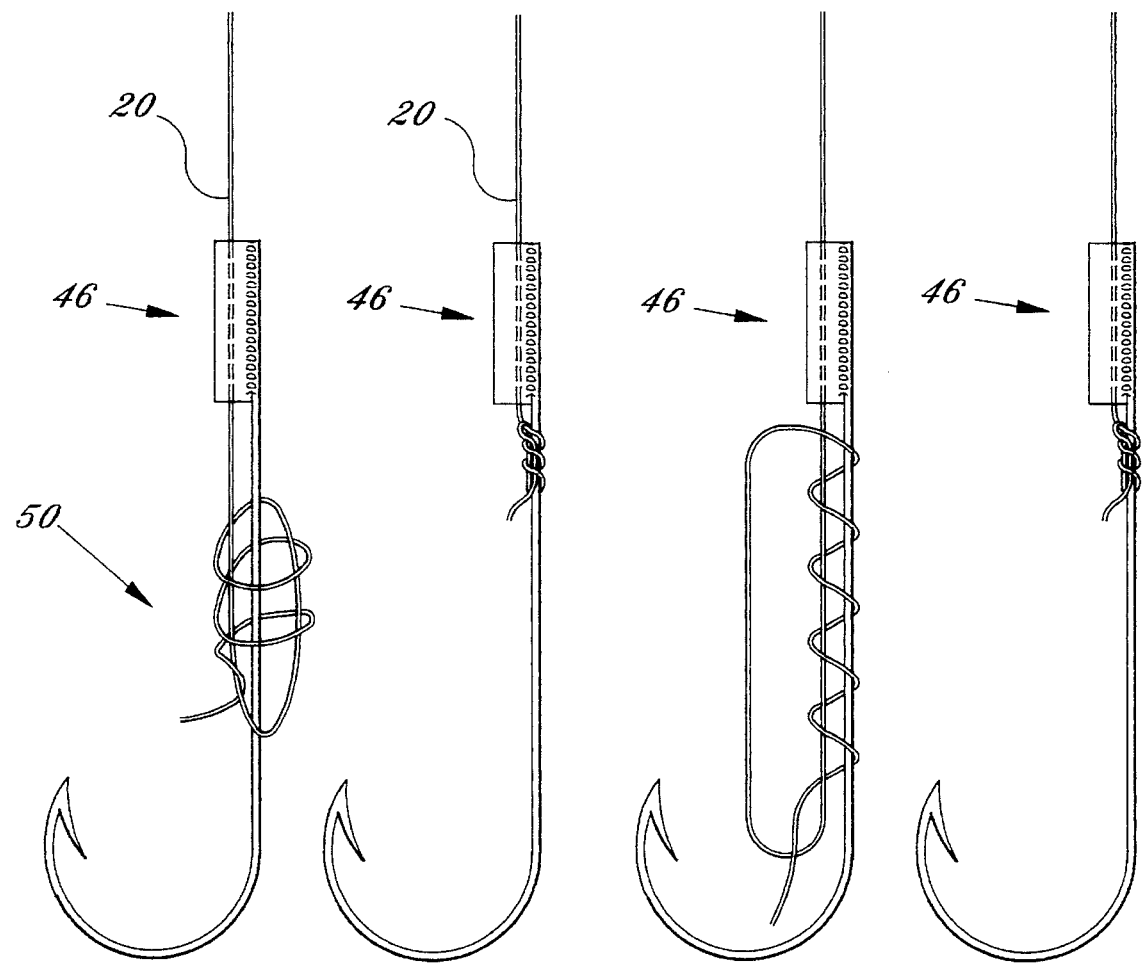
FIGS. 5A–5B illustrate an alternate method of attaching fishing line the to the fish hook of the instant invention.

As depicted in FIGS. 4A–4F, line 20 is attached by threading the line through tubular member 46 such that the line extends through the tube aperture, exiting bottom end 54. Line 20 is then wrapped about shank 40 as seen in FIG. 4C, and formed into a knot as depicted in FIGS. 4F.

Alternately, as depicted in FIGS. 5A and 5B, line 20 can be attached by threading the line through tubular member 46 such that the line extends through the tube aperture, exiting bottom end 54. Line 20 is then wrapped several times about shank 40 as seen in FIG. 5A, extended down shank 40, and knotted as seen in FIG. 5B such that the line end extends back through tube 46 at which point the knot is tightened.

Regardless of the knot used, when properly tensioned, the knot slides up the hook shank 40 to a position adjacent tubular member bottom 52, as seen in FIGS. 4F and 5B. Thus the force exerted by the knotted line is applied longitudinally to the shank. As a result of this knot configuration, the line is naturally subjected to a lesser degree of curvature resulting in less stress concentration, thus reducing the possibility of failure at the knot by increasing knot strength.

Incorporating a tubular member 46 to shank 40 as taught in the instant invention further results in additional benefits. For example, when line is properly knotted and tensioned adjacent tube bottom 54, as seen in FIG. 4F, tube 46 functions to fully shield the section of line threaded through tube aperture, thereby protecting the line from abrasion.

In an alternate embodiment, as best depicted in FIG. 3, tube 46 may be formed having an angled bottom end 54a such that when attached to the hook shank, a portion of tube angularly overhangs the area of the shank where a properly tensioned knot seats. The over hanging tube bottom 54a functions to shield the knot from fraying caused by the teeth of a fish. Therefore, in this embodiment, both the knot and the line passing through tube 46 are protected from abrasion, a common cause of line failure.

In addition, it has been found that attaching line 20 to the hook of the instant invention as depicted in FIGS. 2 and 3, increases the hooks resistance to bending under extreme force. Furthermore, it has also been found that attaching a tubular member to a hook shank as taught in the instant invention causes the hook to spin less than a conventional hook when trolling as the attached tube functions to stabilize the hook.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An improved method of attaching line to a fish hook, including the following steps in the order named:

(a) attaching a tubular member to a shank of said fish hook, said tubular member comprising an elongated cylindrical wall formed about a longitudinal axis and defining a constant diameter aperture, said tubular member attached such that said tubular member axis is axially offset, in spaced parallel alignment with a longidutinal axis of said hook shank;

(b) threading said line through said tubular member;

(c) knotting said line about said hook shank.

2. An improved fish hook, said fish hook having a solid shank, said shank having a lower end terminating in a barb, and an upper end terminating in a shank head, wherein the improvement comprises;

an elongate tubular member comprising an elongated cylindrical wall formed about a central axis, a top end and a bottom end, said wall defining an aperture having a constant diameter extending through said top end and said bottom end;

attaching said tubular member to the hook shank such that the axis of said tubular member is axially offset in spaced parallel alignment with a longitudinal axis of said hook shank.

3. An improved fish hook as in claim 2, wherein said tubular member bottom end is defined by a plane intersecting said tubular member central axis at an acute angle.

4. An improved fish hook as in claim 2, wherein said tubular member bottom end is defined by a plane intersecting said tubular member central axis at an obtuse angle.

5. An improved fish hook as in claim 2, wherein said tubular member bottom end is defined by a plane intersecting said tubular member central axis at a right angle.

* * * * *